March 18, 1941. A. L. LABBE 2,235,261
METHOD AND APPARATUS FOR SINTERING
Filed Aug. 15, 1939 2 Sheets-Sheet 1
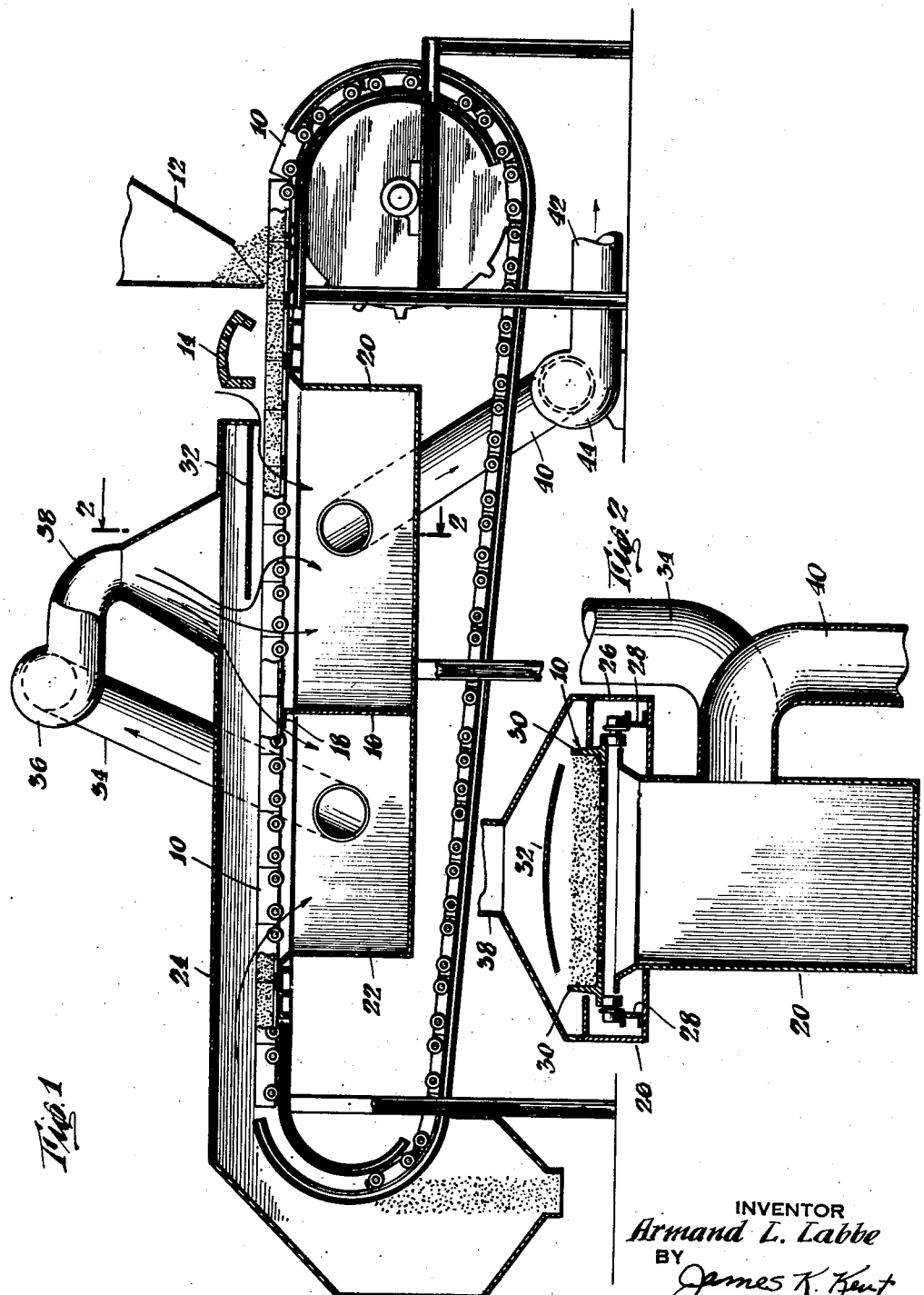
INVENTOR
Armand L. Labbe
BY
James K. Kent
ATTORNEY

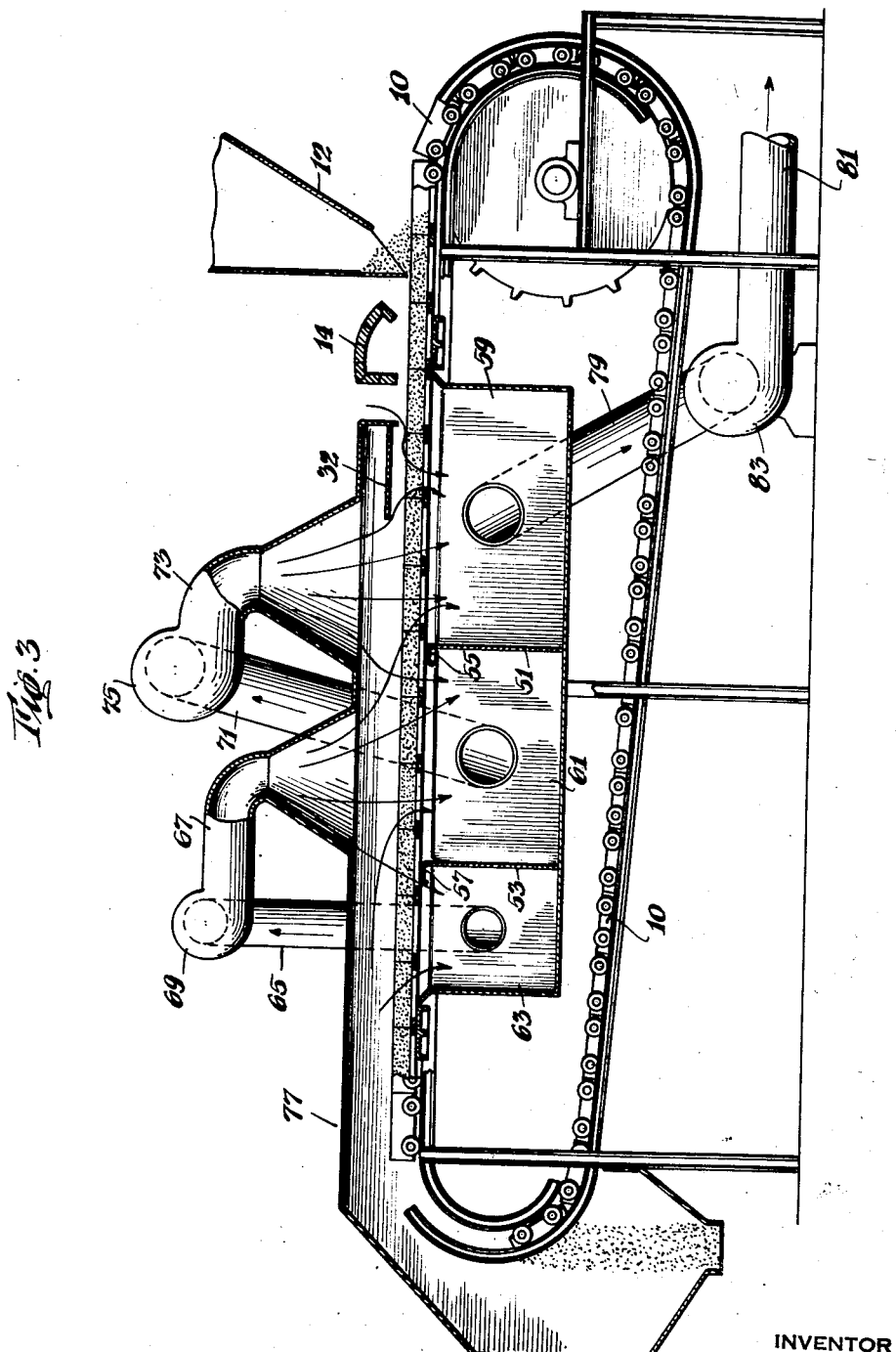

Patented Mar. 18, 1941

2,235,261

UNITED STATES PATENT OFFICE 2,235,261

METHOD AND APPARATUS FOR SINTERING

Armand L. Labbe, Salt Lake City, Utah, assignor to American Smelting and Refining Company, New York, N. Y., a corporation of New Jersey Application August 15, 1939, Serial No. 290,279

8 Claims. (Cl. 266—21)

This invention relates to sintering and provides certain improvements in the construction and operation of sintering machines which improvements are of particular importance in the treatment of sulphidic ores, concentrates and the like where the gases from the operation are subsequently treated for values.

Among other features, the invention provides a gas circulatory system which greatly enhances the efficiency of the air, or other combustion-supporting gas, used in the sintering process.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a side elevation with parts broken away of a sintering machine of the straight-line type embodying the principles of the invention, Fig. 2 is a section taken on the line 2—2 of Fig. 1, and Fig. 3 is a view similar to that of Fig. 1 but showing certain modifications.

Referring now to Figs. 1 and 2, there is shown a sintering machine of the straight-line type having the usual cars 10, charge hopper 12 and ignition burner 14. The wind box of the machine is interiorly divided by a partition member 16 provided with a baffle 18 to provide, in effect, a first wind box 20 and a second wind box 22 which wind boxes are preferably of unequal size, the first being the larger. A hood 24 surrounding the discharge end of the machine extends over the top of the machine and completely covers the second wind box 22 and all but a small portion of the first wind box 20 as illustrated in Fig. 1. Sleeves 26 abutting the sides of the wind box below the pallet tracks 28 and extending around the rail 28 and just short of the pallet sides 30 are provided to prevent substantial circulation of air or gases in that vicinity. Extending from the end of the hood 24 nearest the ignition burner 14 for a substantial distance over the first wind box 20 is an inner hood 32. The second wind box 22 is provided with a circulating pipe 34 which leads to a fan 36 and thence into circulating pipe 38 which opens into hood 24 as shown in Fig. 1. A discharge pipe 40 interconnects wind box 22 with flue 42 via fan 44.

In the modification shown in Fig. 3, the wind box is interiorly divided by two partition members 51 and 53 provided with flanges 55 and 57, respectively, thereby defining a first wind box 59, a second wind box 61 and a third wind box 63, said wind boxes sequentially decreasing in size from the front of the machine to its discharge end. The third wind box 63 is provided with a circulating pipe 65 leading to circulating pipe 67 via fan 69 while the second wind box 61 is provided with a circulating pipe 71 leading to circulating pipe 73 via fan 75. The circulating pipes 67 and 73 discharge into the hood 77 as illustrated, the hood 77 being otherwise similar to hood 24 shown in Fig. 1. A discharge pipe 79 leads from wind box 59 to flue 81 via fan 83.

In operating the machine shown in Figs. 1 and 2, the charge comprising, for example, sulphide ore, is deposited on the grates of the cars or pallets 10 from the charge hopper 12 and passes under the burner 14 and thence under the inner hood 32 and main hood 24 to the discharge end of the machine. Air for the sintering operation enters the discharge end of the machine and is drawn downwardly through the bed into the second wind box 22 by fan 36, the gases from the second wind box passing therefrom through circulating pipe 34 into circulating pipe 38 and thence into the main hood at a point above the first wind box 20. It will be noted that, aside from the suction on wind box 22, there is nothing to prevent the air drawn into the machine from flowing over the rear portion of the charge and into the first wind box.

By reason of the suction on the first wind box 20 exerted by fan 44, the gases discharged into the hood through pipe 38 are drawn through the charge over the first wind box. These recirculated gases, having already passed through the portion of the charge over the second wind box, contain considerable sulphur dioxide and carbon dioxide and are prevented from smothering the newly ignited charge entering the hood by the inner hood 32 which limits the amount of these gases entering the charge in that vicinity. The space between the end of the hood 24 at the burner 14 and the top of the charge permits sufficient air to enter under the inner hood 32 to insure proper burning of the charge. The gases from the wind box 20 are withdrawn through pipe 40 and thence delivered to the baghouse, Cottrell or other treatment unit through flue 42.

The operation of the machine shown in Fig. 3 is similar to that just described except for changes due to the provision of three wind boxes and their associate circulation units. In this case, the air entering at the discharge end of the machine is drawn into the third wind box 63 (though no obstructions are present in the hood to prevent its passage into the second wind box 61 or even the first wind box 59) and the gases from the third wind box are removed through circulating pipe 65 by fan 69 into pipe 67 where they are returned to the hood over the second wind box 61. Gases from the second wind box are withdrawn through circulating pipe 71 by fan 75 and returned to the charge over the first wind box 59. The function of the inner hood 32 is the same as in the operation of the embodiment shown in Figs. 1 and 2 as is also the discharge of the smoke from the first wind box through pipe 79 into flue 81 by action of the fan 83.

Many of the advantages attending the use of the invention will be readily apparent from a comparison of the results actually obtained on "first over" and "second over" charges on a 42" machine following (1) the common practise of sintering employing two wind boxes of equal size with the gases from both wind boxes being withdrawn into a common header connected with a single fan and (2) the procedure of recirculating the gases from the second wind box over the charge above the first wind box as hereinbefore described and withdrawing the final gases from the machine only through the first wind box. Otherwise the operations are the same in all essential details.

In the case of (1) above and operating on "first over" charge, the concentration of sulphur dioxide at the outlet of the second wind box was 1.13% and at the outlet of the first wind box, it was 2.29%. With recirculation according to (2) above, the comparable figures were 2.05% and 5.12%, respectively. In addition, the volume of smoke withdrawn from the machine was reduced from an average of 19,000 C. F. M. down to 6,850 C. F. M. by the hood and gas recirculation illustrated in Figs. 1 and 2. On a wider machine, say, a 72" one, the reduction in volume would be even greater as side leakage would not be proportionately greater. Employing "second over" charge, the sulphur dioxide concentration at the outlet of the second wind box was 0.67% and at the outlet of the first wind box, 2.03% in the case of (1) above. In the case of (2) above the comparable figures were 0.22% and 2.8%, respectively. The combined sulphur dioxide and carbon dioxide figures on "second over" were 1.67% for the second wind box and 4.5% for the first wind box without recirculation and 2.22% and 5.8%, respectively, with recirculation.

It is to be emphasized that, with the gas circulation system of the invention, the recirculated gases are not strictly confined to any particular section of the bed as in some prior art proposals, but are free to continually seek equilibrium with the suction on the bed, the porosity of which is constantly changing in any given particular section as it travels through the machine. Further, while the results shown above were obtained on a machine in which the wind boxes were of equal size, experience shows that over all results are even better if the wind boxes are of decreasing size from front to rear (or, in the case of a sintering machine of the circular or rotary type, from the ignition burner to the discharge), as a more efficient use of the vacuum and saving of power is obtained when the boxes are properly proportioned according to the volume of smoke withdrawn from and returned to each.

In order to illustrate the invention, two specific constructions have been shown in the drawings but it will be understood that various details may be changed and other modifications indulged in by those skilled in the art without departing from the invention as defined in the appended claims. For example, the principles of the invention may be applied to circular machines as well as those of the straight-line type. With respect to the particular machines of the drawings, that shown in Figs. 1 and 2 is well suited for "first over" charges of higher sulphur contents and present comparatively tight beds. With such charges the inner hood is of particular importance. For hot or relatively porous charges, such as usual "second over," the machine illustrated in Fig. 3 is preferred.

What is claimed is:
1. The process for sintering which comprises igniting the charge, immediately thereafter conveying the burning charge into and through a confined space until the sintering operation is completed, drawing gases downwardly through the burning charge by applying a vacuum to the under surface thereof, returning a portion of the gases drawn through the charge to the confined space above the charge and permitting the returned gases to freely seek their own path of flow along substantially the entire surface of the charge within the confined space in response only to the vacuum applied to the under surface of the charge.

2. The process for conducting a sintering operation with a greatly reduced volume of gas which comprises confining all of the burning charge except a small section constituting the most newly ignited portion, applying suction to the lower portion of the gases drawn through the charge portion of the gases drawn through the charge to the upper surface thereof, and permitting the recirculated gases to flow over substantially all of said charge except the most newly ignited portion thereof.

3. The combination with a sintering machine having a travelling bed, a hood overlying said bed substantially from the point of ignition to the point of discharge, and a plurality of wind boxes beneath said bed sequentially decreasing in length beginning with the first nearest the charging means for the machine, of means for drawing gases through the bed into each of said wind boxes and thence returning the gases from any particular wind box, save the first, to the hood at a point above the wind box of next greater length.

4. In a sintering machine, the combination with a hood covering substantially the entire sintering zone of the machine, and a plurality of wind boxes positioned beneath the bed of the machine and sequentially decreasing in length from the igniting station to the discharge station of the machine, of means for withdrawing gases through the bed into each of the wind boxes, and means for returning said gases from all wind boxes except the one nearest the igniting station to the surface of the bed under said hood.

5. Apparatus according to claim 4, characterized by an inner hood extending interiorly from the end of the main hood adjacent the igniter of the machine for a substantial distance over the first wind box and across and above the bed of the machine.

6. In a sintering machine of the straight-line type, the combination with a main hood extending from the igniter over the bed of the machine and around the discharge end thereof, of two wind boxes of unequal lengths, the shorter of which is nearest the discharge end of the machine, means for withdrawing gases from said shorter wind box and discharging same within said main hood at a point above the longer wind box, and an inner hood transversely spanning at least the central portion of the bed of the machine and extending from the end of the main hood adjacent the igniter for a substantial distance over the larger wind box.

7. In a sintering machine having a main hood and means for recirculating gases previously drawn downwardly through the bed to the upper surface thereof, an inner hood transversely spanning at least the central portion of the bed of the machine at the point where the ignited charge enters the main hood, said inner hood being of sufficient length to prevent smothering of the newly ignited charge by the recirculated gases.

8. In a system for recirculating gases over and downwardly through a charge on a sintering machine provided with a hood overlying the bed thereof, a plurality of wind boxes, means for withdrawing gases from some of said wind boxes and discharging said gases within the confines of said hood at a point above the bed of the machine, and means preventing free flow of recirculated gases only over that portion of the bed within the hood nearest the ignition means of the machine.

ARMAND L. LABBE.